United States Patent
Abrahams et al.

(10) Patent No.: US 9,268,533 B2
(45) Date of Patent: Feb. 23, 2016

(54) METHOD AND APPARATUS FOR ENABLING LAYERED PROPERTY DEFINITION IN TRADITIONAL AND CLOUD COMPUTING ENVIRONMENTS

(71) Applicant: International Business Machines Corporation, Armonk, NY (US)

(72) Inventors: Faried Abrahams, Laytonsville, MD (US); Sarbajit Kumar Rakshit, Kolkata (IN); Sandeep Patil Ramesh, Pune (IN); Gandhi Sivakumar, Bentleigh (AU); Lennox Epstein Thomas, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 13/753,994

(22) Filed: Jan. 30, 2013

(65) Prior Publication Data

US 2014/0215430 A1   Jul. 31, 2014

(51) Int. Cl.
*G06F 9/44* (2006.01)
(52) U.S. Cl.
CPC .. *G06F 8/20* (2013.01); *G06F 8/24* (2013.01); *G06F 9/4428* (2013.01)
(58) Field of Classification Search
CPC .............. G06F 8/10; G06F 8/20; G06F 8/35; G06F 9/4428; G06Q 10/067
USPC ................................................. 717/104–105
See application file for complete search history.

(56) References Cited

U.S. PATENT DOCUMENTS

| | | | |
|---|---|---|---|
| 6,134,706 A | | 10/2000 | Carey et al. |
| 7,809,757 B2 | | 10/2010 | Zhuang et al. |
| 2007/0061345 A1 | | 3/2007 | Thompson et al. |
| 2010/0131649 A1 | * | 5/2010 | Ferris ............................ 709/226 |
| 2011/0314062 A1 | | 12/2011 | Boero et al. |
| 2012/0054626 A1 | * | 3/2012 | Odenheimer ................. 715/738 |
| 2012/0266159 A1 | * | 10/2012 | Risbood et al. .............. 717/177 |
| 2014/0123129 A1 | * | 5/2014 | Risbood et al. .............. 717/176 |

FOREIGN PATENT DOCUMENTS

CN   101004680 A1   7/2007

OTHER PUBLICATIONS

Anonymous, "Extensible Workflows for Analytics on the Cloud," IP.com No. IPCOM000216341D, Mar. 31 2012, 4pg.*
Anonymous, "Method for Cloud and Cloud-Service Selection," IP.com No. IPCOM000206909D, May 13, 2011, 8pg.*
Basile et al., "Hierarchical Object Oriented Packaging Design Data Base," IBM TDB vol. 39 No. 12, Dec. 1996, 4pg.*

(Continued)

*Primary Examiner* — Ryan Coyer
(74) *Attorney, Agent, or Firm* — Whitham Curtis Christofferson & Cook, PC (57) ABSTRACT

In developing custom programming, particularly for clients or tenants of a cloud computing environment, following pointers from a candidate, existing object of interest vertically to obtain inherited attributes and horizontally to obtain encapsulated properties and presenting such attributes and properties to a software developer for editing and inclusion in custom object-oriented programming facilitates and expedites accommodation of requirements of model based design for potential or existing tenants or clients of a cloud computing environment.

20 Claims, 5 Drawing Sheets

(56) References Cited

OTHER PUBLICATIONS

Buzzetti et al., "Deploying a Cloud on IBM System z," IBM International Technical Support Organization, Feb. 2011, 84pg.*
Lemos et al., "IBM CloudBurst on System x," IBM International Technical Support Organization, Apr. 2012, 322pg.*
W. Lai et al.; "Network Hierarchy and Multilayer Survivability (RFC 3386)"; ip.com, Nov. 8, 2002.
Basile et al.; "Hierarchical Object Oriented Packaging Design Data Base"; ip.com, Apr. 1, 2005.
Anonymous; "Method for Representing Hierarchical Relationships in Quantitative Data Visually";| ip.com, Mar. 15, 2012.
Malki et al; "Extration of Object-Oriented Schemas From Existing Relational Databases: A Form-Driven Approach"; Informatica, vol. 13, No. 1, 2002, pp. 47-72.

* cited by examiner

METHOD AND APPARATUS FOR ENABLING LAYERED PROPERTY DEFINITION IN TRADITIONAL AND CLOUD COMPUTING ENVIRONMENTS

FIELD OF THE INVENTION

The present invention generally relates to the provision of data processing services and, more particularly, to the provision of data storage and access, data processing resources and/or software as services to clients having arbitrary data processing requirements.

BACKGROUND OF THE INVENTION

High speed data communication networks such as the Internet and private networks have spread virtually worldwide in recent years, allowing access to vast amounts of information from many types of devices ranging from large mainframe computers to portable devices such as so-called smart phones. Conversely, it has become largely immaterial where various data processing resources or interactive terminals are located. Therefore, data processing tasks can be and often are distributed over numerous data processors which communicate with each other through a network such as the Internet or virtual private networks (VPNs) while interaction with such resources can be achieved from a wide variety of fixed or portable devices at arbitrary locations. This capability, in turn, allows people and businesses with data processing needs to avoid some expenses for acquiring and maintaining data processing resources by acquiring such capability as services from a provider that then assumes such costs and responsibilities. Accordingly, the provision of such services is rapidly becoming a major industry, often referred to as "cloud computing", which is a collective term referring to all such services that can be provided by networked data processing resources.

These services fall into three basic categories referred to as infrastructure as a service (IaaS), platform as a service (PaaS) and Software as a service (SaaS). IaaS provides basic networking, load balancing, content delivery and storage, data base management, routing, and hosting of operating systems. PaaS provides a platform for development of software applications with immediate abstractions of the underlying infrastructure. SaaS provides software solutions to system clients and access to data (including database management) that may be internal to a client system or delivered over a network such as the Internet. A cloud service provider (CSP) may provide any combination of such services to a client and the needs of each client may be substantially unique and involve an arbitrary degree of complexity. For example, each client will have different needs for data and each data base, in theory, will need to be uniquely organized, whether private to the client or commercially available to any client. Similarly, for software, the needs of each client will differ and may be extremely complex, such as for managing data delivery and documentation of large projects developed by large groups of persons having a wide variety of expertise in different subject matter areas, sometimes referred to as an enterprise or enterprise system through which communications, product development and documentation are accomplished. The cloud service provider must be able to provide customization of resources such as databases and software to meet the needs of clients, whatever those needs might be.

As an approach to developing software involving an arbitrarily high degree of complexity, so-called object oriented programming or system design was introduced about twenty years ago. The basic concept of object oriented design is to dissect a problem of any degree of complexity into a hierarchy of discrete portions, referred to as objects, with a sufficient degree of granularity that each object, itself, can be very simple and possibly generalized to allow re-use of previously developed software objects to perform, with suitable modifications, similar functions. Each object possesses attributes which can be inherited from objects higher in the hierarchy and encapsulates or hides properties of objects lower in the hierarchy. Each object has a function of returning a result when invoked and may require other objects or resources to perform various portions of that function while the process performed by any given object is not necessarily known to the object above it in the hierarchy which invokes the object. Thus any problem of any degree of complexity can be represented by a network of objects connected by pointers to other objects to invoke those objects and obtain a particular result in response.

Such object oriented design has the benefit of being able to leverage and re-use the software constituting each object since a given object may be invoked by any number of objects potentially having much different functionalities. Further, since properties of hierarchically lower objects are encapsulated or hidden, problems of compatibility between the processes performed by any given object are largely avoided. Since a given object can be used by different objects, the volume of software required for a given function and its cost of development are potentially minimized. On the other hand, a given object oriented design tends to be relatively rigid and difficult to modify or adapt.

SUMMARY OF THE INVENTION

It is therefore an object of the present invention to provide a method and apparatus for creating, evaluating and modifying generic object oriented (OO) program software or objects in an existing object oriented design by a cloud services provider (CSP) to meet a model of client specifications for IaaS and/or SaaS cloud computing services. The invention is not limited to the preferred application to cloud computing service providers which must develop custom software for clients (sometimes referred to as tenants) but is applicable to traditional object-oriented programming environments.

Accordingly, it is another object of the invention to provide a tool for facilitating creation or modification of any object-oriented program design such as for obtaining additional functionality in existing object-oriented computer programs.

It is a further object of the present invention to provide a tool for modeling arbitrary IaaS and/or SaaS client specifications for setting boundaries, attributes and relationships of objects to develop object oriented programming in accordance with a modeling based design approach.

In order to accomplish these and other objects of the invention, an apparatus for facilitating software development in object oriented program design from application of model based design to cloud processing requirements is provided comprising an arrangement to select an object to answer a task developed by the model based design, a parser to vertically follow pointers from the selected objects to a boundary of the object to collect attributes inherited by the object, an arrangement to follow pointers horizontally from the object to collect properties of the object, and an editor to edit the attributes and properties of the object. These elements of such apparatus may be provided through configuration of a computer by use of software.

In accordance with another object to of the invention, a method for facilitating development or modification of custom object-oriented software is provided comprising steps of selecting an object to answer a task developed by the model based design, vertically following pointers from the selected objects to a boundary of the object to collect attributes inherited by the object, following pointers horizontally from the object to collect properties of the object, and editing the attributes and properties of the object.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
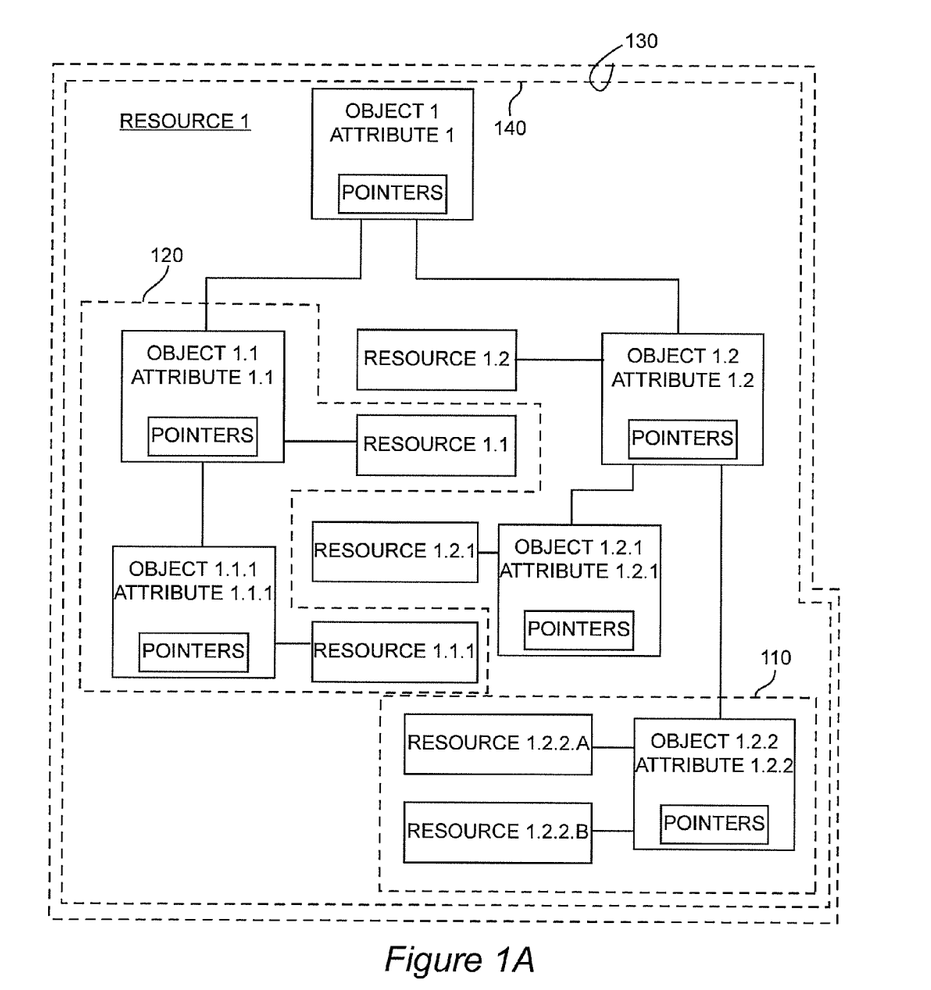
FIGS. 1A and 1B are high level block diagrams or data flow diagrams useful for conveying an understanding of the problem addressed by the invention.
Figure 1B:
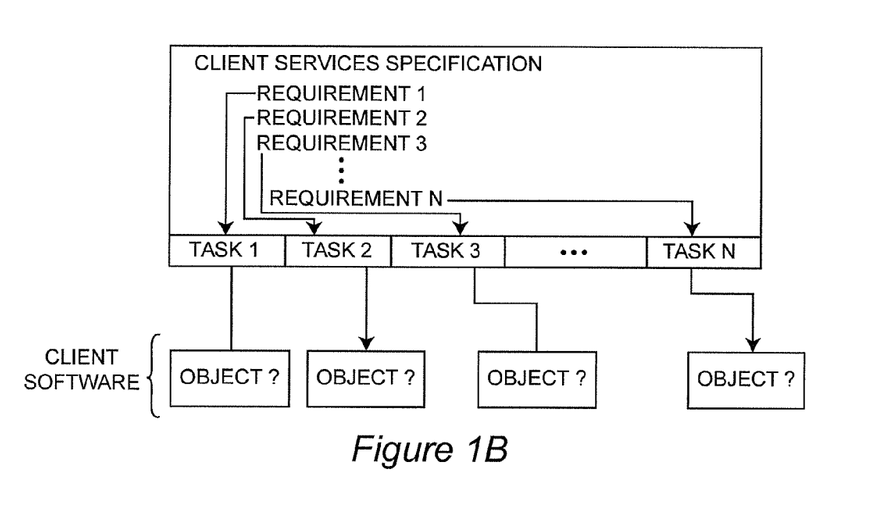

Referring now to the drawings, and more particularly to FIGS. 1A and 1B, an object oriented model and a model based approach to design of an IaaS or SaaS service are schematically illustrated, respectively. At the level of abstraction portrayed in these illustrations, those skilled in the art will recognize that both Figures may be understood as either block diagrams or data flow diagrams. Further, at the illustrated level of abstraction and generalization, the invention may or may not be illustrated in these Figures. Therefore no part of either Figure is admitted to be prior art in regard to the present invention.

FIG. 1A illustrates a hierarchical tree structure of objects for performing an arbitrary task. Each object is illustrated as having at least one resource (or, more properly and generality, referred to as a property or properties of the objects hierarchically below it which are hidden by the object)) associated therewith that is used in perfoimance of its associated function. Note that for object 1, the entire hierarchy of objects below it constitute resource 1, Indicated by dashed line 140 of which there may be a plurality. Each object has at least one attribute (only one being depicted for each object) which establish the type or class to which the object belongs in accordance with its function. However, as alluded to above, additional attributes may be inherited from objects hierarchically above the object including whether the inherited attribute is mandatory or optional. Each object also includes pointers to particular resources (e.g. other objects having and hiding their own set of properties of hierarchically lower objects) to be used in performing its function and pointers to other objects for performing portions of the function of each respective object, which are thus resources or properties of the object) and returning a result when the function of the object is completed. Each such object collection which forms a functional component of software can be considered as having a boundary 110, 120, 130 that establishes the entities involved in performing the function of the object and, importantly, the root entity for all objects below it in the tree hierarchy. For example, for object 1.2.2 at the lowest or leaf level of the tree hierarchy, boundary 110 delimits a single object and its associated resources while for object 1 as the root entity, the boundary 130 depicted by a double dashed line would comprehend the entirety of FIG. 1A. At levels below that of the root entity and above the leaf level the boundary of a given object, for example object 1.1, would comprehend that object and all hierarchically lower objects (e.g. object 1.1.1 at the leaf level under object 1.1) required to perform its function. Conversely, for example, object 1 or object 1.1 may be considered a root entity in regard to object 1.1.1, depending on the object boundary. Thus, as alluded to above, each object encapsulates or hides the relationships or resources associated with it as well as associated objects that are lower in the hierarchical tree and which are manifested in the object only as pointers while each object inherits all attributes of all objects above it in the hierarchical tree. Therefore, neither the inherited attributes nor the identities of relationships or resources (e.g. those of hierarchically lower objects) need be specified in a given object when defining the boundaries of a componentt.

Referring now to FIG. 1B, a generalized example of model based design is illustrated. It will be appreciated, as will be discussed in greater detail below, that a cloud service provider (CSP) will need to develop particular software to provide the services (e.g. IaaS or SaaS) to provide a database organization and/or particular data processing functionality required by any potential client which cannot be known in advance. (Of course, a CSP can provide PaaS to provide a software development platform, possibly including the invention, to another CSP not having the capability of developing custom software.) To facilitate timely and economical development of such software, a CSP will initially have or develop a library of generalized objects that can be customized and assembled into hierarchies by specification of pointers and will also, over time, develop a library of software objects that have been developed for existing or prior clients, some of which may be used directly (e.g. where different clients have access to shared public database) or can be modified or customized by alteration of attributes and/or pointers.

A model based design as illustrated in FIG. 1B begins with a specification of required services and/or functionality. This specification can then be broken down into individual requirements (e.g. requirement 1, requirement 2, . . . requirement N) for which individual tasks can be determined and to which the client requirements are mapped. To develop the required software for providing required services to a client with arbitrary requirements, it is then necessary to map the tasks to particular objects which may already exist in the object or client software libraries of the CSP and to make any necessary modifications thereto, although the CSP may occasionally develop a special purpose object to meet a requirement of a potential client. Even in such a case, such a special purpose object may be custom assembled from other objects that may exist. In other words, in model based design, component boundaries are defined and artifacts of the requirements/specifications are generated automatically as incidents of the model based design process.

However, as noted above in regard to FIG. 1A, the objects themselves contain only a specification of their own attribute (s) since other attributes are inherited from attributes at a higher level or the tree hierarchy while the relationships and/or resources associated with an object are specified only by pointers which conceal the identity of the relationship or resource. That is, object properties are defined by the "parent"

objects and remain constant across the different service contexts vertically and are never influenced by the elements (e.g. resources and/or relationships) contained within the object and thus horizontal relationships and resources are not manifested. Further, inheritance of attributes and the collection of resources associated with an object directly or through other objects is dependent on how the object boundary is defined. This characteristic of objects developed through object oriented design or programming presents gaps in the specification of properties which are not self-contained in the respective objects. These gaps in the specification of properties of respective objects present issues when generating components of software for potential clients to answer the tasks which map to the requirements of such potential clients because the inherited attributes and encapsulated relationships/resources (collectively referred to as properties) are not available from the object, itself. Therefore, the software developer, seeking to use or modify existing objects to the greatest extent possible for efficiency in developing custom software or making custom modifications of software for a potential client has difficulty in evaluating a candidate object for inclusion, with or without modification, in the software being developed or to determine modifications which will render an existing object capable of performing a task in the desired manner.

To avoid the problem of gaps in the description of the attributes and properties available to the software developer, the invention provides for inherited attributes and properties to be communicated to a software developer as if specified in the object, itself, as presented (e.g. by a display, the details of which are not important to the practice of the invention for producing its meritorious effects) to the software developer. As alluded to above, the gaps in information comprise influences in the vertical direction for attributes and horizontal direction for properties. When an existing object is selected for possible inclusion in software being developed, the boundaries of the object are defined, either logically (based on the context of the object in a program or within a generic object; which operation can be performed automatically) or at the will of the software developer (e.g. as illustrated at 120 of FIG. 1A) if the root entity is to be changed. The chain of hierarchically higher objects is then parsed and the attributes may be edited by addition, deletion or marking as optional rather than mandatory as could result from direct inheritance and prepended to the attribute(s) of the object of interest. The properties of the object of interest are then obtained by following pointers in the object horizontally to obtain the identities of relationships associated with the object of interest which are then combined with the inherited attributes previously obtained. The object identification together with the attributes and properties of the object are then presented to the software developer in a form suitable for editing and modification to create an object suitable for inclusion in the software being developed. It should be appreciated that modification of attributes can be made to automatically delete hierarchically higher objects or search the libraries of the CSP for other suitable objects of a suitable type and with suitable attributes to match the modification for combination with the current object of interest. Modifications of properties merely involve the modification of pointers which can also be done automatically in accordance with resources available to the CSP.

To convey a better understanding of these functions of the invention, FIGS. 2 and 3 will now be discussed which respectively provide examples of vertical influences and horizontal influences on an object of interest. Since these attributes and properties are embodied in the objects and resources related to the object of interest in the vertical and horizontal directions, the functions of obtaining such information and apparatus for performing the functions are referred to hereinafter as coordinate influenced data property enabler (CIDP).

Figure 2:
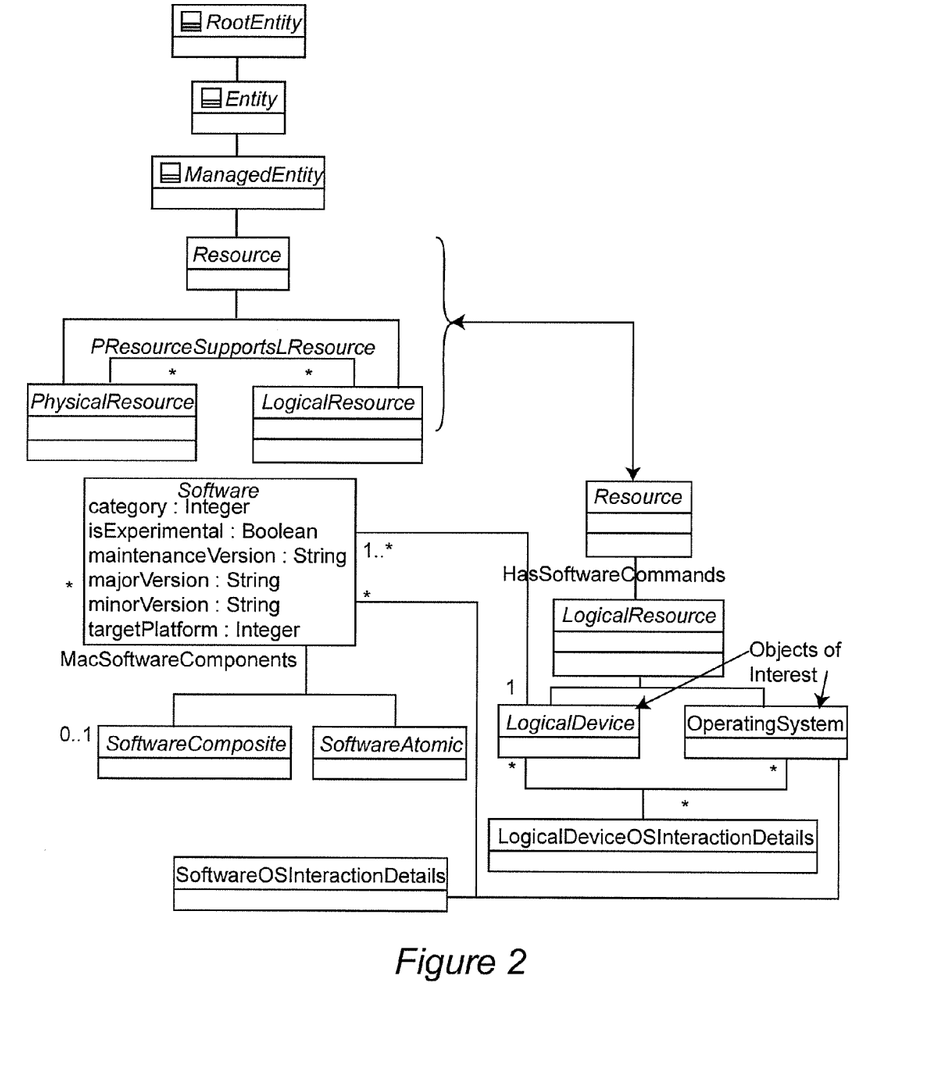
FIG. 2 is a block diagram or data flow diagram illustrating vertical influence of objects.

Referring now to FIG. 2, a hierarchical tree structure in which LogicalDevice and OperatingSystem objects are of interest is shown. The software and associated objects for performance of the function of the object and LogicalDeviceInteractionDetails by which the objects of interest can be modified and which is appended to the object of interest during software development are also illustrated. These objects of interest are six hierarchical levels below RootEntity and inherit common attributes from the upper five levels. A common attribute such as identification (ID) is derived from the root entity and the context in which the identification appears in, for example, Entity, ManagedEntity, Resource and LogicalResource. While the hierarchical level of the object of interest is immaterial, the attribute, along with a specification of whether the attribute is mandatory or optional and editing of cardinality, that are inherited can be obtained. That is, if an attribute is defined as mandatory in its upper hierarchy, it need not be mandatory in the lower hierarchy. Likewise, if the cardinality (e.g. the order of attributes of an object) of an attribute is –1* in a hierarchically higher object it need not be –1* in the current object. For example, OperatingSystem may have an ID that is optional whereas LogicalDevice may have an ID that is mandatory although both objects obtain ID through inheritance. Thus, information as to inherited attributes can be obtained and placed in an editable form for possible modification by tracing pointers upward through the hierarchical tree.

Figure 3:
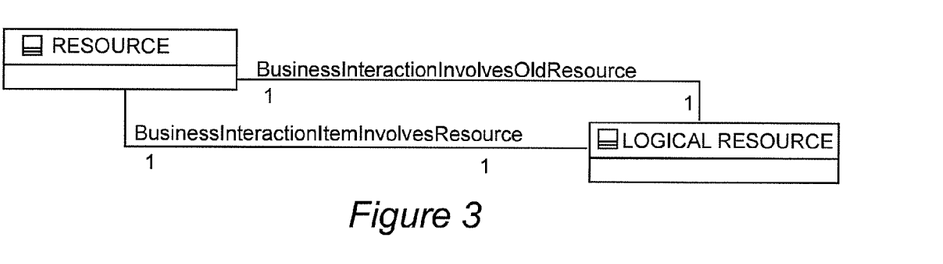
FIG. 3 is a block diagram or data flow diam illustrating horizontal influences on an object.

FIG. 3 illustrates exemplary horizontal influences on properties of an object of interest. In this example, the object of interest is Resource and involves a relationship of property of object LogicalResource containing a set of data and a corresponding previous set of data. The object or the relationship or property is accessed through either of two functions, ResourceInvolveLogicalResoure or resourceInvolvesOldLogicalResource, depending on the set of data to be accessed. The LogicalResource object is thus insensitive to the object by which it is accessed in the horizontal direction. In any case, it is clear that property information in regard to an object can be obtained for any object of interest by following pointers in the horizontal direction and the property information thus obtained can be combined with the information in regard to inherited attributes and the information presented to a software developer in an editable form.

Figure 4:
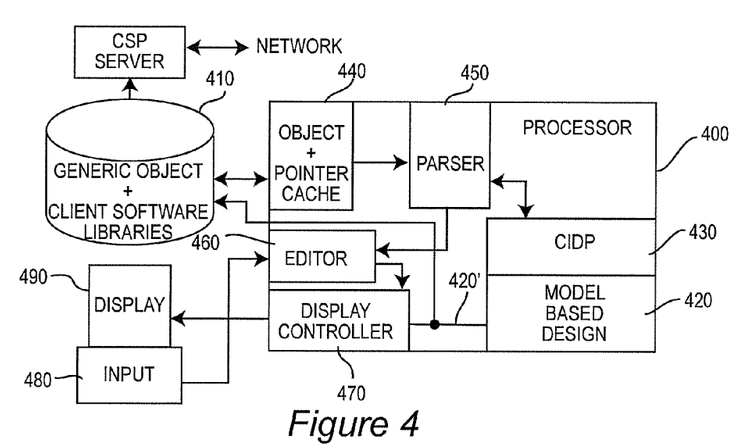
FIG. 4 is a high level block diagram or dataflow diagram illustrating a preferred architecture for an embodiment of the invention.
Figure 5:
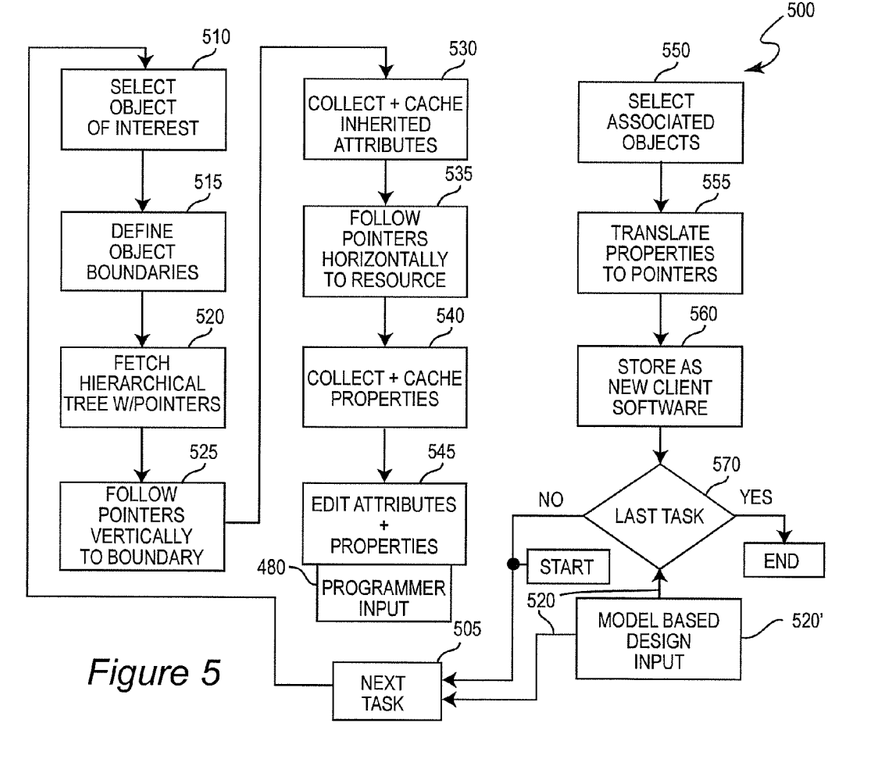
FIG. 5 is a flow chart of a preferred methodology of the operation of the invention, and FIG. 6 corresponds to FIG. 1A but includes a depiction of the result of operation of the invention.

Referring now to FIGS. 4 and 5 a preferred architecture for apparatus for practicing the invention and a flow chart of the methodology of the invention will now be discussed. It should be understood that the invention is preferably embodied in software that configures a general purpose data processor into special purpose logical device hardware, in combination, to perform the respective functions of the invention as summarized above and which will now be discussed in detail.

As illustrated in FIG. 4, processor 400 preferably includes an arrangement for access to a library 410 of generic objects and previously developed client software; the latter of which is also accessible by a CSP server that provides IaaS and SaaS services to clients. Processor 400 also preferably hosts model based design software 420 for performing the operations described above in connection with FIG. 1B, details of which are not important to the practice of the invention but which performs the analysis of a client specification of IaaS and/or SaaS services which are automatically dissected into discrete tasks as discussed above in regard to FIG. 1B that provide input to the coordinate influenced data property (CIDP) enabler 430, in accordance with the invention which configures and controls elements 440-470 within processor 400. Preferably, the model based design software is concurrently running with CIDP software of the invention. The model based design software 420 also provides an output to the display controller 470 such that the specification analysis can be displayed at display 490 and controlled from program developer input 480. The discrete tasks developed by the model based design software are then individually addressed by the program developer and mapped objects which can be concurrently modified and incorporated into custom client software that meets the requirements of the model based design.

Upon choosing a task to be addressed by development of corresponding software, library 410 is accessed to obtain candidate generic or client objects that may be suitable for providing the functionality required by the task. The number of candidate objects is made manageably small by sorting in accordance with type and/or class of the objects and the object ID; which information is available within the respective objects. One or more potentially suitable candidate objects is returned and stored in object and pointer cache 540. This information is forwarded to parser 550 which follows the hierarchy (or data return pointers) vertically to object boundaries specified by the software developer and follows the pointers horizontally to collect inherited attributes and properties associated with the specified object of interest, respectively. This information is then supplied to an editor and displayed to the software developer on display 590 through display controller 470. The software developer may then edit the displayed information at will to add, delete or change attributes and identifications (IDs), including change of whether the attribute is mandatory or optional and cardinality (e.g. the order of attributes) and modify pointers to access appropriate relationships and establish appropriate properties. When the editing is complete to the satisfaction of the software developer, the information is then converted to a format appropriate to object-oriented program language and stored in library 410 from which it can be accessed by the CSP server to provide custom IaaS and/or SaaS service to the client for whom the software is developed. It should be noted that such a generated component of custom software can also be used in traditional object-oriented design environments including service oriented architecture (SOA) and non-SOA based object-oriented environments This functionality of processor 400 when configured by the CIDP in accordance with the invention is illustrated in greater detail in the flow chart of FIG. 5. Specifically, the methodology in accordance with the invention begins with selection of a task 505 from the tasks output by the model based design 420' that serves as an input to the CIDP and which controls the proposal and selection of a candidate object 510. The software developer may then allow the boundary of the object to default to the root entity of the object or may define (515) a root entity for the object which is lower in the hierarchical tree as discussed above in connection with FIG. 1A. The corresponding hierarchical tree is then retrieved from library 410 as depicted at 520.

Once the hierarchical tree of an object has been retrieved and stored in cache 440, parser 450 follows pointers vertically (525) along a data return path to the object boundary, previously defined and the inherited attributes are collected and cached in order as depicted at 530. Then (or prior to operation 525; the order being immaterial to the successful practice of the invention) pointers are followed horizontally (535) to identify the resources or relationships corresponding to the object and the properties of the object are collected and cached, as depicted at 540. The software developer can then edit the attributes and properties of the object at will as depicted at 545.

Once the attributes and properties of the object have been edited to the satisfaction of the software developer, the attributes are used to select other objects to be associated with the object, in order, in order to provide for inheritance of the desired attributes in the object of interest, as depicted at 550. Similarly, the selected properties, as modified by editing, are translated into pointers as depicted at 555 and the object stored as depicted at 560. It is then determined (e.g. from the model based design input) at 570 if any further tasks remain to be answered, whereupon a next task is selected; repeating the process of FIG. 5. If not, the process ends.

Figure 6:
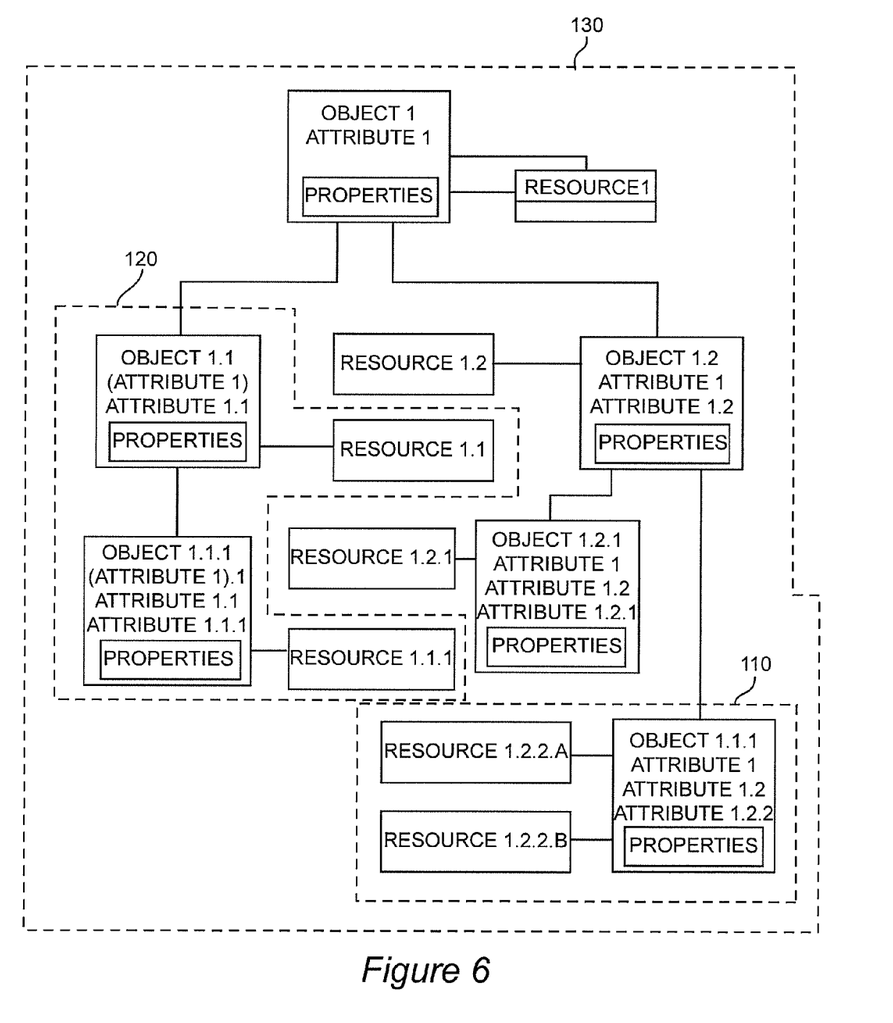

Referring now to FIG. 6 and comparing it to FIG. 1A, the effects of the invention can be readily seen. That is, it will be recognized that FIG. 6 is identical to FIG. 1A except that attributes of each object include the inherited attributes of objects higher in the hierarchical tree with the cardinality aligned locally and that properties are indicated rather than pointers. It should also be appreciate that the attributes of object 1.1 and 1.1.1 indicate attribute 1 in parentheses in order to indicate that attribute 1 would not be included if the boundary of object 1.1.1 was selected such that its root entity was object 1.1 as indicated by dashed line 120 as alluded to above, but would be displayed if the boundaries were the default value indicated by dashed line 130 and object 1 was the root entity. Thus the displayed information indicated for each object in FIG. 6 would correspond to the information collected from the hierarchical tree in accordance with the invention but before editing was performed. It should be appreciated that the ordering or cardinality of the attributes can be edited and would have the effect of reorganizing the hierarchy of other objects relative to the object of interest into a different hierarchical tree. Objects can also be deleted and resources altered at will to form new objects that answer the tasks developed through a model based design approach to meeting the data access and/or data processing requirements of any potential client of a CSP.

In view of the foregoing, it is clearly seen that the invention provides apparatus and methodology which can greatly facilitate and expedite the development of customized software in an object oriented (OO) and efficient programming design. While OO design in programming allows for and supports leveraging of existing software to permit re-use for different but at least marginally related functions, the invention allows a further and additional leveraging of OO software for the development of custom software for potential clients from previously developed software or generic objects that may be available and does so in a manner which is fully compatible with model based design while solving issues caused by gaps due to inheritance of attributes and encapsulation of properties of objects in OO programming design. It should be appreciated that following pointers vertically to obtain inherited attributes can be beneficially used by a software developer to find potentially more appropriate objects to edit while it is relevant to the properties of an edited object whether attributes are inherited or specified within the object itself.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. Apparatus for facilitating software development in object oriented program design from application of model based design to cloud processing requirements, said apparatus comprising:

an arrangement configured within a first computer processor to select an object to answer a task developed by said model based design in response to said processing requirements,     a parser configured within a second computer processor to follow pointers from said selected object to a boundary of said object to collect attributes or properties inherited by said object, said inherited attributes or properties being termed "vertically inherited attributes",     an arrangement configured within a third computer processor to follow pointers from said object to collect properties or attributes encapsulated by said object, said encapsulated attributes or properties being termed "horizontally encapsulated properties", and     an editor configured within a fourth computer processor to edit said vertically inherited attributes and horizontally encapsulated properties of said object in response to said processing requirements,     wherein any two configured computer processors may be implemented on the same physical processor or on different physical processors which communicate with each other through a network.

2. The apparatus as recited in claim 1, further including a library of objects for performing respective functions.

3. The apparatus as recited in claim 1, said editor further including an arrangement to edit cardinality of vertically inherited attributes.

4. The apparatus as recited in claim 1, said editor further including an arrangement to alter an inherited attribute in regard to the vertically inherited attribute being inherited as mandatory or optional.

5. The apparatus as recited in claim 4, said editor further including an arrangement to edit cardinality of vertically inherited attributes.

6. The apparatus as recited in claim 1, said editor further including an arrangement to edit pointers associated with an object.

7. The apparatus as recited in claim 6, said editor further including an arrangement to alter a vertically inherited attribute in regard to the vertically inherited attribute being inherited as mandatory or optional.

8. The apparatus as recited in claim 7, said editor further including an arrangement to edit cardinality of vertically inherited attributes.

9. A method for facilitating development or modification of custom object-oriented software, said method comprising steps of     selecting by a configured fourth computer processor an object to answer a task developed by a model based design in response to processing requirements,     following by a configured fifth computer processor pointers from said selected objects to a boundary of said object to collect attributes or properties inherited by said object, said inherited attributes or properties being termed "vertically inherited attributes",     following by a configured sixth computer processor pointers from said object to collect properties or attributes encapsulated by said object, said encapsulated attributes or properties being termed "horizontally encapsulated properties", and     editing by a configured seventh computer processor said vertically inherited attributes and horizontally encapsulated properties of said object in response to said processing requirements,     wherein any two configured computer processors may be implemented on the same physical processor or on different physical processors which communicate with each other through a network.

10. The method as recited in claim 9, further including an arrangement configured within a configured eighth computer processor to edit cardinality of said vertically inherited attributes.

11. The method as recited in claim 9, further including altering by a configured ninth computer processor a vertically inherited attribute in regard to the vertically inherited attribute being inherited as mandatory or optional.

12. The method as recited in claim 11, further including editing by a configured tenth computer processor cardinality of vertically inherited attributes.

13. The method as recited in claim 9, wherein said selecting step is performed within a library of previously created objects.

14. The method as recited in claim 9, further including editing by a configured eleventh computer processor pointers associated with an object.

15. The method as recited in claim 14, further including altering by a configured twelfth computer processor a vertically inherited attribute in regard to the vertically inherited attribute being inherited as mandatory or optional.

16. The apparatus as recited in claim 15, further including editing by a configured thirteenth computer processor cardinality of vertically inherited attributes.

17. A method for facilitating development or modification of custom object-oriented software from a model based design, said method comprising steps of     configuring a first computer to provide an arrangement to select an object to answer a task developed by said model based design in response to processing requirements,     configuring a second computer to provide a parser to follow pointers from said selected objects to a boundary of said object to collect attributes or properties inherited by said object, said inherited attributes or properties being termed "vertically inherited attributes",     configuring a third computer to provide an arrangement to follow pointers from said object to collect properties or attributes encapsulated by said object, said encapsulated attributes or properties being termed "horizontally encapsulated properties", and     configuring a fourth computer to provide an editor to edit said vertically inherited attributes and horizontally encapsulated properties of said object in response to said processing requirements,     wherein any two configured computers may be implemented on the same physical computer or on different physical computers which communicate with each other through a network.

18. The method as recited in claim 17, further including configuring a fifth computer to provide a library of objects for performing respective functions.

19. The method as recited in claim 18, further including configuring a sixth computer to edit pointers associated with an object.

20. The method as recited in claim 19, further including configuring a seventh computer to alter a vertically inherited attribute in regard to the vertically inherited attribute being inherited as mandatory or optional.

\* \* \* \* \*